Figure 1:
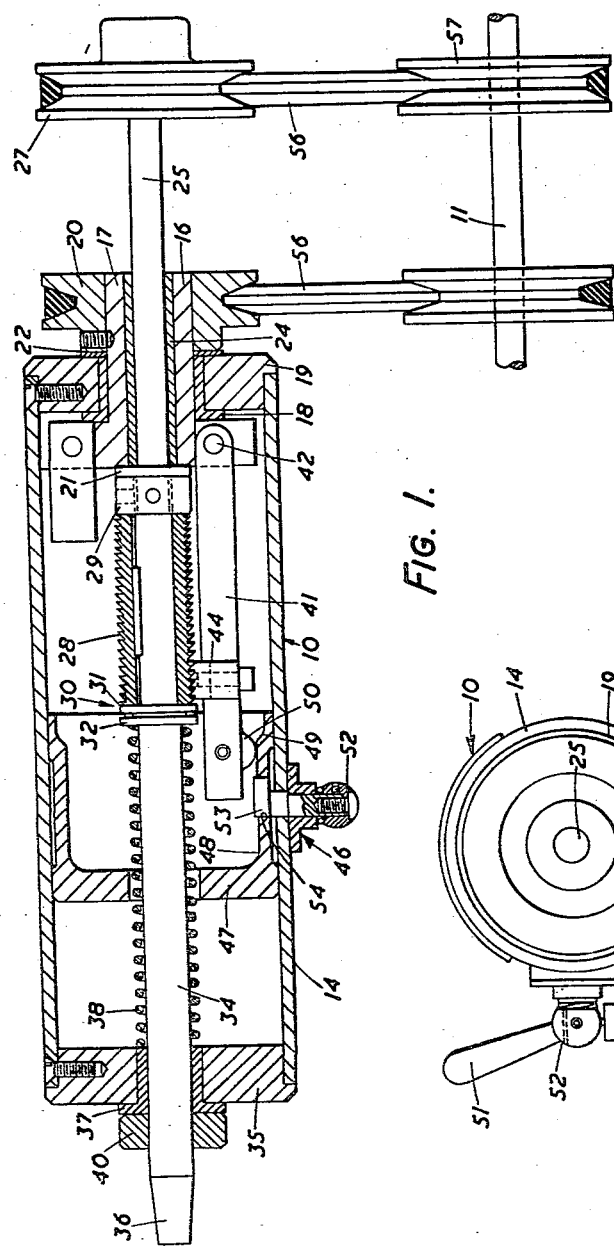

Oct. 1, 1963  R. E. HAYDEN  3,105,397
STEP-DOWN TRANSMISSION MECHANISMS
Filed Sept. 5, 1961  2 Sheets-Sheet 1

INVENTOR
RONALD E. HAYDEN

BY
Watson, Cole, Grindle & Watson
ATTORNEYS

United States Patent Office 3,105,397
Patented Oct. 1, 1963

3,105,397
STEP-DOWN TRANSMISSION MECHANISMS
Ronald Ernest Hayden, "Ridgeway," 21 Ernest Road, Emerson Park, Hornchurch, England
Filed Sept. 5, 1961, Ser. No. 135,968
Claims priority, application Great Britain Sept. 7, 1960
3 Claims. (Cl. 77—34.4)

This invention relates to an improved form of feed mechanism for deriving a very slow linear or rotary output motion of an output member from a rapidly rotating driving shaft. The invention is particularly although not exclusively applicable to a feed mechanism for a rotary drill head.

According to the present invention such a feed mechanism comprises two intermediate rotary members driven at slightly different speeds of rotation from the driving shaft, and speed-differential mechanism connected between the two intermediate members and arranged to convert the speed differential between them into the required slow output motion of the output member.

In a preferred form of the invention at least one of the intermediate members is driven from the driving shaft by a belt drive incorporating a variable-diameter pulley. With such an arrangement not only is the speed differential between the two intermediate members, and hence the rate of feed of the output member, infinitely variable between wide limits, but also a much smaller speed differential can readily be produced giving a much slower output feed, than can conveniently be produced by other feed mechanisms such as gear trains.

The differential mechanism comprises a lead screw rotated by one intermediate member and a co-operating screwthreaded follower rotated by the other intermediate member in coaxial engagement therewith, the resultant speed differential producing relative linear movement in the axial direction between the lead screw and follower.

The speed-differential mechanism may be movable between an engaged and a disengaged position between the two intermediate members, and this movement may be provided by a camming device which is actuable from outside the casing in which the feed-mechanism resides.

In one form the camming device includes a piston mounted within the casing of the feed-mechanism and is formed with a skirt having a cam surface, the speed-differential mechanism engaging this cam surface which is arranged to move the speed-differential mechanism between its engaged and disengaged positions by movement of the piston within the casing of the feed-mechanism. The piston may be movable by the rotation of a lever which extends outside the casing of the feed-mechanism.

Another aspect according to the present invention lies in a combination of such a feed mechanism in an automatic drill-head.

Figure 2:
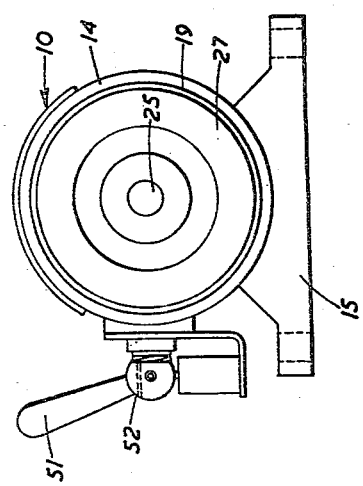
Figure 3:
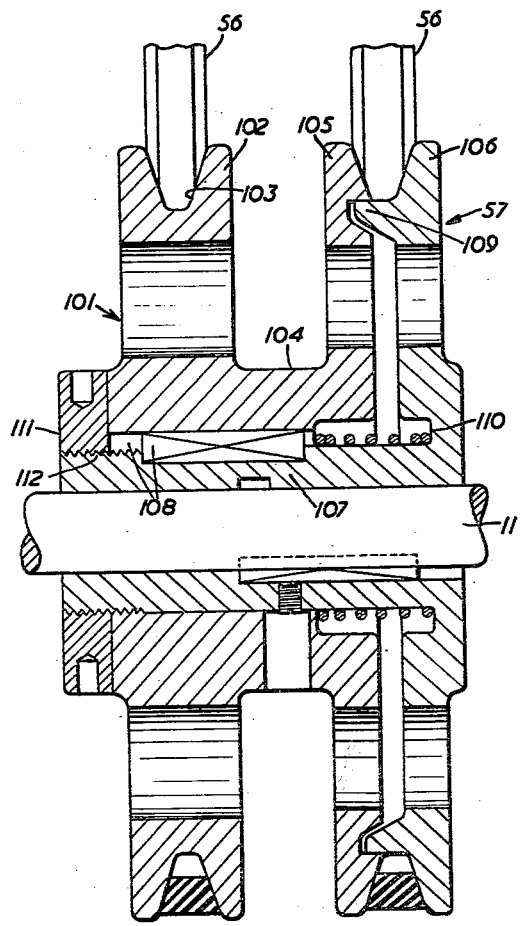

The invention may be carried into practice in various ways but two specific embodiments will now be described by way of example with reference to the accompanying drawings in which:

FIGURE 1 is a longitudinal section of a feed mechanism associated with an automatic drill head, showing part of the drive shaft for the drill head, FIGURE 2 is an end view of the feed mechanism of FIGURE 1, and FIGURE 3 is a longitudinal section of the drive pulley assembly including the variable diameter pulley.

In the embodiment of FIGURES 1 and 2, a feed mechanism 10 is employed to advance a drill head (not shown) slowly at a required rate towards the work and to feed a rotating drill secured to a drive shaft shown partially at 11 into the work. The feed mechanism 10 comprises a generally cylindrical body 14, and as shown in FIGURE 2 is provided with supporting brackets 15 which can be tack-welded onto the body or stand of the drill at a required position.

Mounted within the body 14 is a flywheel 16 having an axially protruding boss 17 which is journalled in a bushing 18 mounted coaxially in one end wall 19 of the body 14, the boss 17 protruding from the body 14 and carrying a V-pulley 20 (referred to as the differential pulley) mounted on its protruding end outside the body. Thrust rings 21, 22 prevent axial displacement of the flywheel 16 relatively to the body 14. The flywheel boss 17 is formed with an axial bore in which is fitted a plain sleeve bearing 24, and an elongated spindle 25 journalled in the bearing 24 extends through the flywheel 16 and protrudes at both ends, the spindle 25 thus being rotatable relatively to the flywheel 16 and also being movable in the axial direction relatively to the flywheel. A second V-pulley 27 (referred to as the feed pulley), and of the same effective dimensions as the differential pulley 20, is mounted on the extreme outer end of the spindle 25 outside the body 14, and a sleeve 28 formed with an external helical screw-thread of buttress profile is keyed to the inner end of the spindle 25 between a stop nut 29, serving to limit the axial sliding movement of the spindle 25 in the outward direction, and one member 31 of a thrust race 30 mounted on the extreme inner end of the spindle.

The other member 32 of the thrust race 30 is mounted on the inner end of an actuating shaft 34 which is journalled in the other end wall 35 of the body 14 and is a coaxial extension of the spindle 25, the end 36 of the actuating shaft 34 protruding from the body 14 for engagement with the drill shaft, or with the drill head as a whole. The actuating shaft 34 is slidable in the axial direction in a bush 37 mounted in the end wall 35 of the body, and is biassed in the inward direction by a spring 38 acting between the bush 37 and the thrust race member 32 on the actuating shaft 34, but its inward movement is limited by a stop collar 40 which can be clamped on the protruding outer end 36 of the shaft 34 in a desired position, to provide an adjustment of its operating length.

The rotatable flywheel 16 carries a rocking arm 41 which is pivoted at one end to a point on the periphery of the flywheel 16 by means of a dowel pin 42, and extends down the body 14 in a direction generally parallel to the axis of the spindle 25, the rocking arm 41 lying close to the threaded exterior of the sleeve 28, and being rockable about an axis transverse to but spaced from the axis of the spindle 25. A follower nut 44 is rigidly mounted on the rocking arm 41 near its end remote from the pivot 42, and is formed on its surface adjacent to the threaded sleeve 28 with a pattern of arcuate internal screw-threads of buttress profile corresponding in radius and pitch with the helical external screw-thread of the sleeve 28 on the spindle. The follower nut 44 can be pressed into threaded engagement with the sleeve 28 by a camming device 46 acting on the end of the rocking lever 41 to urge it inwardly. This device 46 comprises a piston 47 slidably mounted in the interior of the body 14 and having a skirt 48 projecting in the axial direction towards the flywheel 16. A cam ring 49 is formed on the extreme inner edge of the piston skirt 48 and co-operates with a protruding ball 50 mounted in the rocking arm 41, so that when the piston is moved towards the flywheel 16 the cam ring 49 forces the ball 50, as it rotates around the piston skirt 48, in the radially inward direction and thus presses the follower nut 44 into engagement with the threaded sleeve 28. Similarly when the piston 47 is moved in the other axial direction away from the flywheel 16, the cam ring 49 allows the ball 50 and the end of the rotating arm 41 to move radially outwardly to disengage the follower nut 44 from the threaded sleeve 28.

As shown in FIGURES 1 and 2 movement of the piston 47 is effected manually by means of a lever 51 mounted outside the body 14 on the end of a stub shaft 52 which is journalled in the side wall of the body 14 and carries an operating pawl 53 on its inner end which engages in a recess 54 in the skirt 48 of the piston 47. As the stub shaft 52 is rotated by the lever 51, the pawl 53 moves the piston 47 axially in the corresponding direction.

The feed pulley 27 and the differential pulley 20 of the feed mechanism 10 are driven by V-belts 56 from two spaced driving pulleys 57, 101, which are rigidly mounted on the electric motor driving shaft 11 for the drill as shown in FIGURES 1 and 3. Pulley 101 is a V-pulley of fixed diameter while the other pulley 57 is of the variable diameter type. The two pulleys are respectively coupled by belts 56 to drive the differential and feed pulleys 20 and 27.

The fixed diameter pulley 101, which is of conventional form and comprises a circular disc 102 having a circumferential V-groove 103 formed about its periphery, is centrally apertured for coaxial location about the driving shaft 11 and carries a coaxial, axially extending sleeve 104 which has formed at its outer end a circular radial flange 105. The radial flange 105 together with a second radial flange 106 arranged side by side with it and carried on an end of a further sleeve 107 forms the variable diameter pulley 57.

The sleeve 107 is fixedly keyed to the shaft 11 and is encircled by the sleeve 104 which is slidably supported upon it, the two sleeves being keyed together by a key and keyway arrangement 108 arranged to prevent relative rotational movements between the two sleeves while permitting axial movement of the outer sleeve 104 along the length of the inner sleeve 107.

The peripheral edges of the adjacent faces of the two circular flanges 105, 106 are suitably chamfered to form between them a V-groove around the circumference of the variable diameter pulley which they together comprise. The base of the V-groove is formed by a circular rib 109 which is carried on the inner face of the flange 106 and which projects into a correspondingly formed groove in the adjacent face of the other flange 105.

A compression spring 110 surrounding the sleeve 107 is arranged to thrust the two flanges apart and urge the sleeve 104 along the length of the sleeve 107 into abutment with an adjustment nut 111 threaded on to the end of the sleeve 107 remote from the flange 106. Thus by adjustment of the nut 111 along the length of the threaded portion 112 of the sleeve 107 the spacing between adjacent faces of the two flanges 105, 106 can be varied to change the axial dimensions of the V-groove of the variable diameter pulley and so change the effective diameter of the pulley. By appropriate adjustment of the variable-diameter driving pulley 57 the feed pulley 27 and the threaded sleeve 28 rotated by it can be made to rotate at an angular velocity that is very slightly different from that of the differential pulley 20, and of the flywheel 16 and follower nut 44 driven thereby. Accordingly a small relative angular velocity will be established between the follower nut 44 and the threaded sleeve 28, and when the nut 44 is held in engagement with the sleeve 28 a corresponding linear feed will be applied to the sleeve and so to the spindle 25 carrying the feed pulley 27, since the follower nut 44 is prevented from moving in the axial direction by the flywheel 16 which carries it. This axial movement of the spindle 25 is transmitted to the actuating shaft 34 and hence to the drill head or drill shaft coupled to the actuating shaft 34. The feed is initiated by rotation of the manual lever 51 in one direction to actuate the camming device 46 and bring the rotating follower nut 44 into engagement with the differentially-rotating threaded sleeve 28, and is automatically disengaged on the rotation of the manual lever 51 in the other direction, the piston 47 being moved further away from the flywheel 16 by the outward radial movement of the pivoted arm 41 under centrifugal force. Moreover the rate of feed is readily adjustable simply by variation of the effective diameter of the variable-diameter driving pulley 57 to alter the difference in angular velocity between the flywheel 16 and the spindle 25. Moreover a very small speed difference, corresponding to a very slow rate of feed, can readily be produced by means of the variable-diameter pulley arrangement.

An an example, if the speed of rotation of the flywheel is 2760 r.p.m. and that of the spindle is 2875 r.p.m. a ratio of 24:25 then given a master and follower thread pitch of 0.1 inch, the feed will be $$\frac{0.1}{25}$$

or 0.004 inch per spindle revolution, and the actual rate of feed will be 0.19 inch per second.

What I claim as my invention and desire to secure by Letters Patent is:

1. A machine-tool feed-mechanism comprising two coaxial rotary members of which one carries a lead screw, and the other carries a follower nut which is pivotally supported thereon, the lead screw and its associated rotary member being axially movable with regard to the follower nut and to the other member, driving means for driving the two rotary members at slightly differening speeds of rotation, the said driving means being adjustable to vary the speed difference between the two rotary members infinitely within a given range, cam follower means fixedly secured to the follower nut and stationary cam means engaged with said cam follower means and adjustable to move the follower nut pivotally about its associated rotary member between a position in engagement with said lead screw, and a second position disengaged therefrom.

2. A feed mechanism as claimed in claim 1, including a cylindrical housing within which the lead screw is rotatably supported, and a cylindrical sleeve slidably supported within the housing, which sleeve has a cam surface formed upon its inner curved surface, the said cam surface being formed as an inwardly facing surface of revolution coaxial with the sleeve and having a camming profile whose radial height varies in the direction of the sleeve axis, the said cam surface being operably engaged with said cam follower means and means for moving the sleeve within the housing in the axial direction thereof to cam the follower nut into and out of engagement with the lead screw.

3. A feed-mechanism as claimed in claim 2, in which the follower nut is pivotally mounted upon its associated member about a pivot axis transverse to and radially spaced from the axis of rotation of said rotary member whereby centrifugal force tends to move the cam follower means out of engagement with the lead screw.

References Cited in the file of this patent

UNITED STATES PATENTS

| | | |
|---|---|---|
| 1,946,214 | Kabigting | Feb. 6, 1934 |
| 2,113,723 | Everett | Apr. 12, 1938 |
| 2,472,744 | Esson | June 7, 1949 |
| 2,893,276 | Quackenbush | July 7, 1959 |

FOREIGN PATENTS

| | | |
|---|---|---|
| 664,952 | Great Britain | Jan. 16, 1952 |